United States Patent Office 3,306,596
Patented Feb. 28, 1967

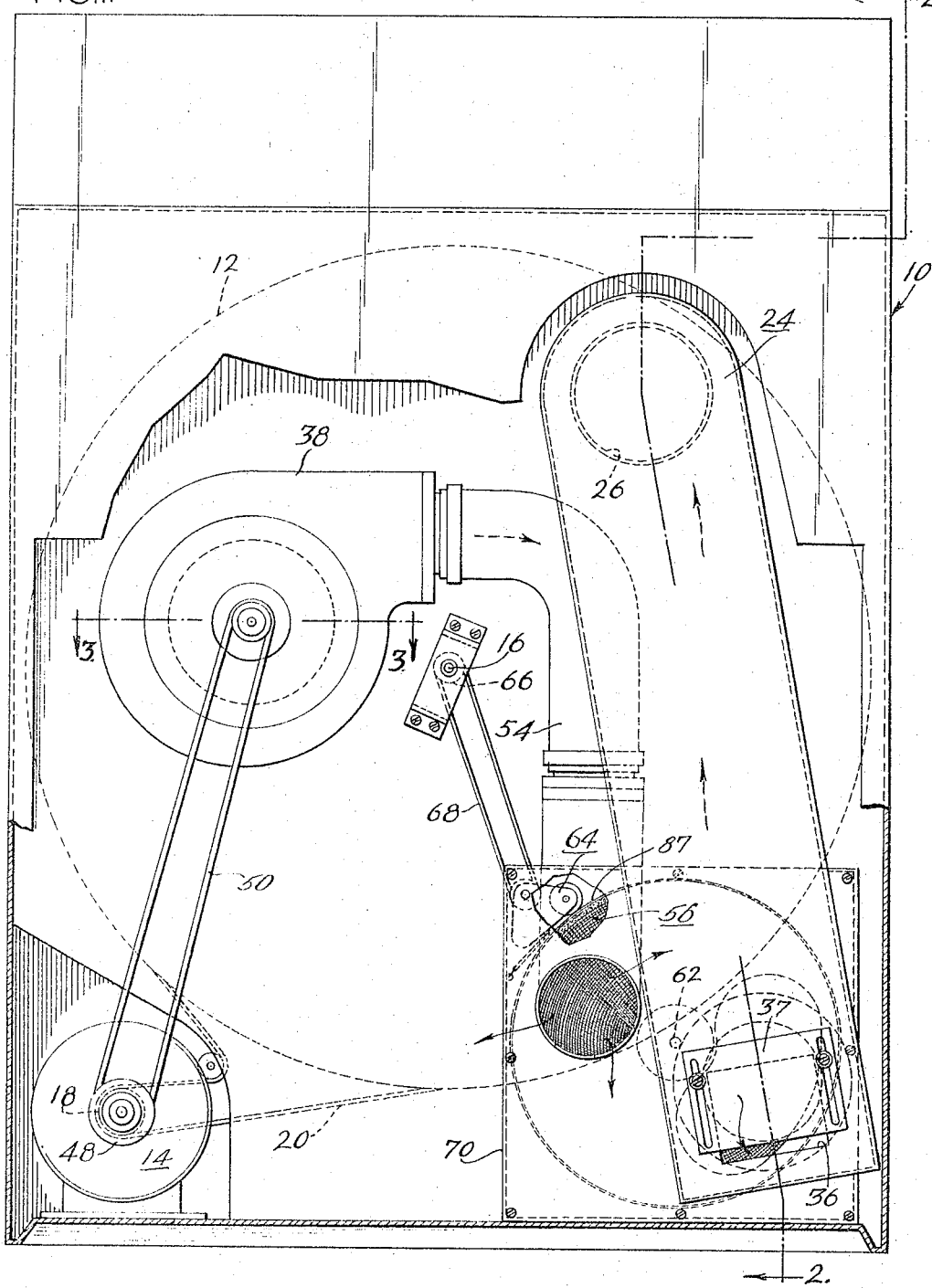

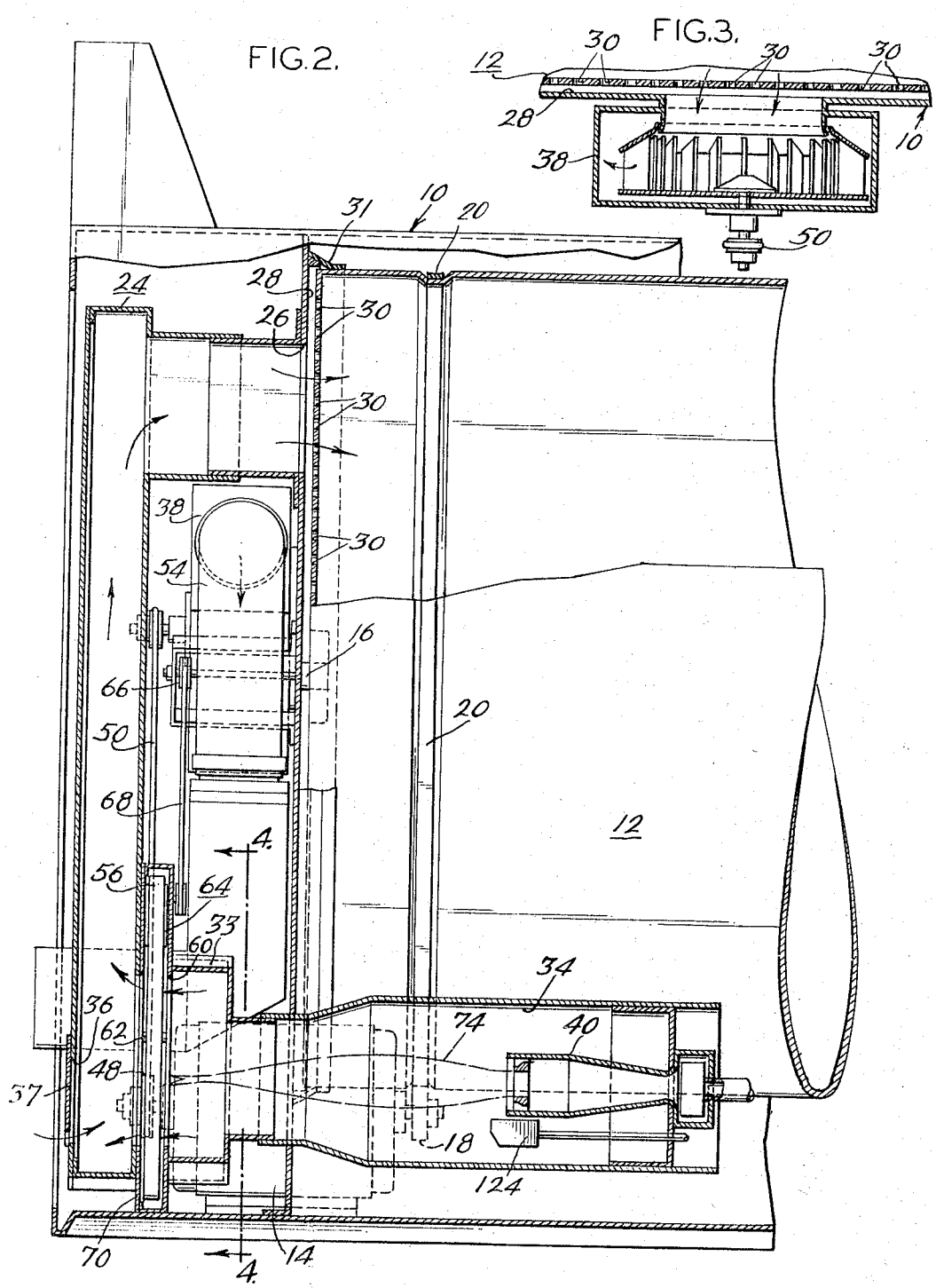

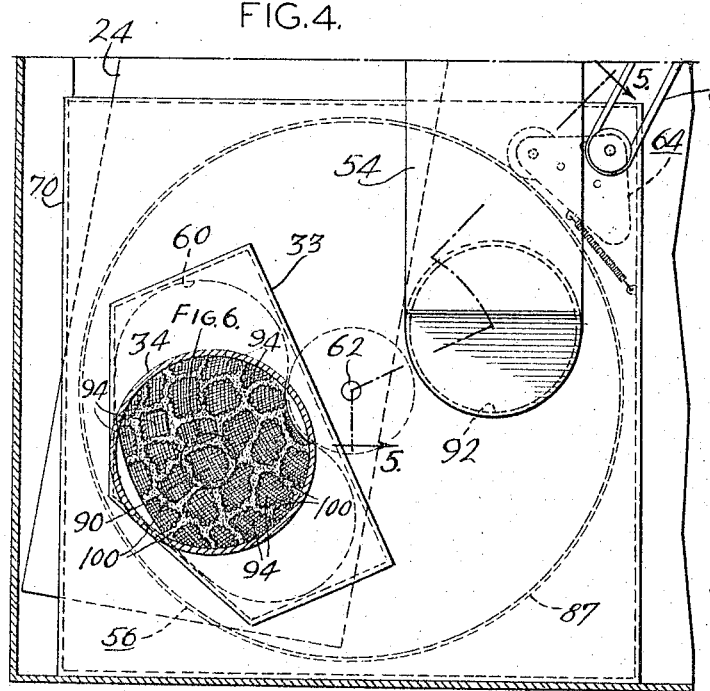
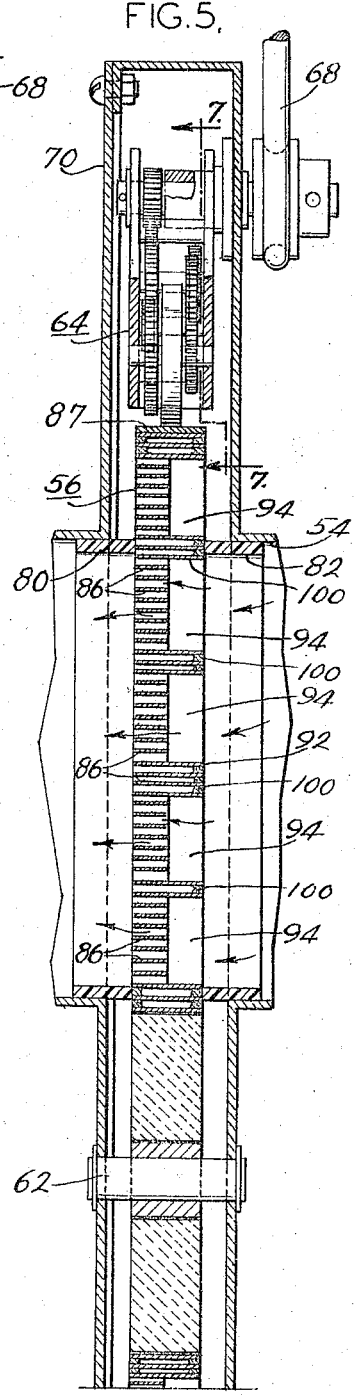
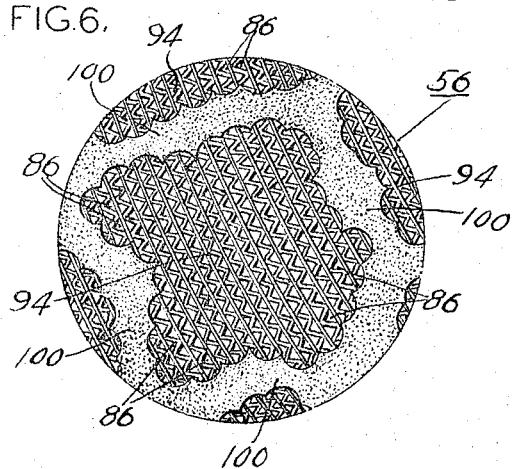
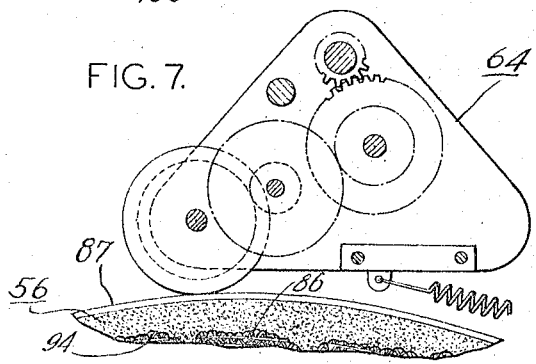

3,306,596
HEATED-GAS SYSTEM WITH APPARATUS FOR REMOVING GAS-BORNE FOREIGN BODIES
George T. Hollowell, Mayfield Heights, Ohio, assignor to American Gas Association, Incorporated, New York, N.Y., a corporation of New York
Filed Jan. 28, 1965, Ser. No. 428,694
14 Claims. (Cl. 263—10)

This invention relates to systems employing a flow of heated gas and in which apparatus is provided for removing foreign bodies carried by the gas. More particularly, it relates to systems, such as clothes dryers, in which the flow of heated gas is used to produce drying, and to apparatus for continuously removing foreign bodies, such as lint, from the gas stream.

There are a variety of applications in which a heated gas is passed through a system and in which it is desirable to remove and dispose of foreign bodies which are carried by the gas stream. One important example of such a system is the domestic clothes dryer, in which heated air is passed over and through the clothes to effect drying thereof, the clothes ordinarily being agitated so that a substantial quantity of lint is thereby dispersed into the air stream; such airborne lint, if freely discharged from the dryer, is known to be undesirable both practically and esthetically. While the invention is of broad applicability, it will be described herein primarily with reference to such heated-air clothes dryer systems and apparatus.

A large variety of proposals, some of which have found practical application, have been made as to how the air leaving the drying compartment of a clothes dryer may be treated to remove lint therefrom. One of the common methods for such lint removal involves placing a removable screen in the exhaust duct of the dryer, on which screen a considerable percentage of the air-borne lint collects during each drying operation. The screen is intended to be removed by the operator after one or a few drying operations, the accumulated lint removed from it, and the screen replaced before the next drying operation.

Such arrangements have a number of practical drawbacks. First, it is awkward and inconvenient for the operator to perform the screen removal, cleaning and replacement operations. Secondly, it is inevitable that the operator will, on occasions, forget or neglect to remove and clean the filter, in which case the performance of the dryer is considerably impaired and, in fact, the normal operation thereof may thereby be sufficiently affected to require service calls and repairs. Thirdly, even during a single drying operation the increasing accumulation of lint on the filter produces an increasing impedance to the flow of exit air from the dryer, and to this extent may exert an appreciable adverse effect upon the operating efficiency of the dryer.

Other attempts at lint removal have included arrangements utilizing electromagnetic attraction of lint to a collecting surface, centrifugal removal of the lint from the stream of air, and the use of a water spray to wash the lint from the discharge duct of the dryer. Such arrangements have not found wide use, particularly in domestic clothes dryers, because of undesirable complications in the apparatus required or because of the inefficiency of the resulting lint removal, or for both reasons.

Another approach which has been proposed involves the incineration of the lint in the discharge duct where it has been collected. One such proposed system is described in U.S. Patent No. 2,809,025 of E. S. Pettyjohn, issued October 8, 1957, and entitled, "Apparatus for Eliminating Lint in Discharge Duct of Clothes Dyer."

In the latter system, the air which is used for effecting drying is heated in an air inlet duct by a gaseous fuel burner, and the lint is collected by a rotatable screen in the exit duct from the clothes dryer compartment. A bypass tube is provided between the burner and the screen in the exit duct whereby hot combustion gases are applied to a portion of the screen to incinerate the lint collected thereon. The bypass tube terminates in a slit at the end thereof adjacent the rotating screen, the slit being so disposed with the exit duct as to lie parallel to a radius of the screen and at a slight distance from it. The screen is rotated entirely within the exit duct and serves to collect lint from the entire cross-section of the exit duct and to subject it to incineration as it is moved past the slit end of the bypass tube from which the hot combustion gases emanate.

However, there are also a number of drawbacks or limitations in the arrangement proposed in the above-identified patent. While the use of the bypass tube eliminates the need for a separate gaseous fuel burner for the incineration step, the heat which is supplied by the hot combustion gases to the exit duct and the additional heat generated by the burning of the lint are essentially wasted insofar as their use in the drying process is concerned, since such heat is produced in the exit duct and carried therefrom to the room by the air flow in the system. Furthermore, since combustion gases, rather than the hot flame of the gaseous fuel burner, are used to produce incineration of the lint, the temperatures applied to the collected lint are lower than would be the case if the flame itself were applied to the lint, and the effectiveness of complete combustion of the lint and residual combustible matter such as tars and ash is correspondingly lower. Furthermore, the apparatus requires the insertion and operation of a substantial number of mechanical elements in the exit duct, and the presence of the bypass tube itself in the discharge duct to some extent interferes with the free flow of air through the exit duct. In some applications the very high temperature of air exiting from the clothes dryer may also be harmful or dangerous to nearby objects.

Accordingly, it is an object of the invention to provide new and useful apparatus for removing foreign bodies from a stream of heated gas.

Another object is to provide such apparatus in which the foreign bodies are collected from the heated gas and substantially completely incinerated.

Another object is to provide such apparatus which operates automatically and continuously.

A further object is to provide such apparatus which produces a minimum of disturbance of the flow of said heated gas.

It is also an object to provide a new and useful heated-gas system including apparatus for collecting and incinerating foreign bodies contained in the heated gas, in which the heating of the gas and the incineration of the foreign bodies are provided by a common gaseous fuel burner.

It is also an object to provide such a system in which substantially all the heat utilized in, and produced by, the incineration of the foreign bodies is used to produce a useful heating of said gas.

Another object is to provide a new and improved clothes dryer including apparatus for collecting and disposing of lint and similar foreign bodies, dispersed into the drying air in the clothes drying compartment.

Another object is to provide a clothes dryer of the type in which a gaseous fuel burner provides heating of air which is supplied to a clothes drying compartment and removed from the compartment by way of a discharge duct, and in which lint is continuously and automatically collected from the air passing through the discharge duct and transported to the burner where it is incinerated substantially completely.

It is also an object to provide such a clothes dryer in which a single gaseous fuel burner flame is utilized to provide heating of the drying air and to produce incineration of lint, and in which the combustion of the lint is substantially complete so as to substantially eliminate smoke, odor, and residual combustible matter such as tar and ash.

A further object is to provide the latter type of operation by means of apparatus which is relatively simple in construction and operation, does not interfere undesirably with the flow of air in the clothes dryer including its inlet and outlet ducts, is relatively inexpensive to provide and operate, and is susceptible of easy incorporation into existing types of clothes dryers.

In accordance with the invention these and other objects are achieved by the provision, in a system of the type in which burner means are provided to heat gas at a first location along a gas-flow path in a system, of means for collecting at another location along the gas-flow path those foreign bodies which are borne by the gas and for transferring them therefrom to the burner means for incineration thereby. In the case of a clothes dryer, this is preferably accomplished by means of a rotatable lint filter which extends simultaneously into both the discharge duct of the system and into the region heated by the flame of the burner, the filter having such dimensions and having its axis of rotation so positioned that lint collected on a portion thereof subjected to impingement by the stream of gas flowing in the discharge duct is carried by rotation of the filter to the region in which it is incinerated by the flame of the burner. In accordance with a further feature of the invention, the rotatable filter is of a high-temperature-resistant material of low thermal conductivity, such as a cellular ceramic filter having its honeycomb apertures extending through it in the direction of intended gas flow. An especially advantageous form of the filter comprises such a ceramic honeycomb-like structure having a plurality of irregular recesses extending partially therethrough from the surface at which it is impinged by the flow of gas in the discharge duct, the sidewalls of the recesses being irregular in form so as to catch and retain the lint as desired for transport from the discharge duct to the burner means.

In the preferred embodiment of the invention as applied to clothes dryers, there is employed a clothes drying compartment in which the clothes are agitated and subjected to the heated air. An air inlet duct is provided to conduct air to the clothes compartment, and an air discharge duct is provided for discharging air from the compartment. Means, such as a blower fan, are also provided for establishing a flow of air from said inlet duct to the drying compartment and thence by way of the discharge duct to the exterior of the dryer. A gaseous fuel burner provides a flame for heating air at the inlet duct; preferably the burner flame is located in the path of the inlet air so that an especially hot flame can be obtained, and a shutter provides a controllably-variable opening to the exterior in the inlet duct between the flame and the clothes drying compartment, by means of which suitable regulation of the temperature produced by the flame and of the temperature of the air supplied to the clothes drying compartment may be produced. The chamber housing the burner, and the discharge duct, are preferably disposed adjacent each other and so that the flow of air therethrough is parallel and in the same direction. The ceramic lint filter then extends laterally in front of the burner flame on one side, and laterally through the walls of the discharge duct by way of appropriate air seals. The filter is rotated continuously at a relatively low rate, whereby the lint is continuously collected in recesses in the ceramic filter of the discharge duct and moved through the air seal from the discharge duct to a position in which it is exposed to the burner flame.

In this way heating of the air for the drying operation and incineration of the collected lint are accomplished by the same flame. Furthermore, all of the heat of the flame, plus some additional heat due to the burning of the lint, is applied to heat the air supplied to the drying compartment, and none is wasted by being bypassed to the discharge duct as in certain prior-art systems. Furthermore, because the incineration is produced directly by the flame, which can be, and preferably is, made very hot, substantially complete combustion of the lint and any other combustible foreign bodies is attained without any appreciable production of smoke, odor, residual tar or ash. The system requires no maintenance by the operator since the lint is continuously incinerated, and the ceramic filter is always effective and does not unduly interfere with the flow of gas in the discharge duct because the incineration continuously cleans the lint from the filter. Furthermore, the system requires no special controls and can be added to existing types of clothes dryers with only minor modifications thereof.

These and other objects and features of the invention will be more readily understood from a consideration of the following detailed description, taken in connection with the accompanying drawings, in which:

FIGURE 1 is a rear view of a preferred embodiment of a clothes dryer employing the present invention;

FIGURE 2 is a sectional view taken along lines 2—2 of FIGURE 1;

FIGURE 3 is a fragmentary sectional view taken along lines 3—3 of FIGURE 1;

FIGURE 4 is a fragmentary sectional view taken along lines 4—4 of FIGURE 2;

FIGURE 5 is a fragmentary sectional view taken along lines 5—5 of FIGURE 4;

FIGURE 6 is an enlarged fragmentary view of a portion of the ceramic honeycomb filter, as indicated in FIGURE 4; and FIGURE 7 is a fragmentary sectional view taken along lines 7—7 of FIGURE 5.

Considering now by way of example only the specific embodiment of the invention illustrated in FIGURES 1 through 7 hereof, and in which corresponding parts are indicated by corresponding numerals, the invention will now be described as it may be embodied in a domestic clothes dryer.

As shown for example in FIGURES 1 and 2, the dryer cabinet 10 supports a rotatable drum 12 and an electric motor 14 for rotating the drum about the axle 16. Motor 14 drives drum 12 in rotation by means of the pulley 18 on the motor drive shaft and the belt 20 which extends around the periphery of the drum 12. The drum 12 comprises the usual clothes drying compartment, the rotation of drum 12 producing the desired agitating or tumbling action of the clothes which facilitates their exposure to the hot dry air.

Dry heated air is supplied to the drying compartment as follows. Inlet air duct 24 is connected at one end to the air inlet orifice 26, the latter orifice communicating with the interior of drum 12 by way of the drum compartment 28 and a plurality of small openings such as 30 in the flat interior end of the drum. An appropriate gasket arrangement 31 provides an appropriate air seal to the drum. The opposite end of inlet duct 24 communicates with the expansion chamber 33 of a burner chamber 34 and with an adjustable dilution-air opening 36 provided with a shutter 37 which can be manually adjusted to control the amount of dilution air drawn into the inlet duct. Burner chamber 34 contains a gaseous fuel burner 40 which communicates with room air at the end of chamber 34 remote from inlet duct 24 and is supplied with fuel gas by conventional means (not shown).

As is shown particularly clearly in FIGURES 1 and 3, a rotary blower 38 is mounted from cabinet 10 at the rear of drum 12 and rotated by way of pulley 48 and belt 50 so as to withdraw air from the rear of drum 12 by way of the above-mentioned apertures 30. Blower 38 then draws the moisture-and-lint-laden air from drum 12 and forces it through the outlet duct 54 and the rotating ceramic lint filter 56 to the exterior. Accordingly, as indicated by the arrows in the figures, blower 38 produces a flow of air from the room to the interior of drum 12 by way of burner chamber 34 and dilution-air opening 36, inlet duct 24, drum compartment 28, apertures 30 in drum 12, the interior of drum 12 containing the clothes to be dried, outward through apertures 30 to the interior of blower 38, and thence through discharge duct 54 and ceramic lint filter 56 to the exterior.

The gaseous fuel burner 40 contained in and mounted on burner chamber 34 preferably comprises a power-assisted burner employing a nozzle with flame retention ports to prevent blow-off of the flame by the high velocity of the air-gas fuel mixture passing through the burner port. To eliminate the need for an auxiliary blower to supply the necessary primary combustion air to the burner, combustion chamber 34 is sealed closed. Thus, the only opening into the combustion chamber for combustion air is the primary air opening of the burner. The negative pressure created by blower 38 therefore acts to draw in air through the burner, thereby to cause the power burner to operate properly. The velocity and hence the amount of air passing through the burner chamber 34 can be decreased to any desired level to achieve the desired inlet air temperature by varying the opening of air inlet shutter 37; opening shutter 37 further reduces the negative pressure acting on the burner chamber 34 and therefore reduces the temperature in the combustion chamber and the temperature of the air supplied to the interior of drum 12.

In accordance with the invention, the ceramic lint filter 56 extends entirely across and through the discharge duct 54 and in front of the opening 60 of burner chamber 34 which communicates with inlet duct 24. Filter 56 is rotatable about an axis 62 by means of a spring-biased rim drive arrangement 64. Rim drive arrangement 64, in turn, is driven from a pulley 66 on the axle 16 of drum 12, by way of a belt 68. As shown in more detail in FIGURE 7, appropriate speed-reducing gear or pulley arrangements may be utilized to reduce the speed of rotation of filter 56 to any desired value.

Ceramic filter 56 is mounted for rotation in housing 70. As shown particularly clearly in FIGURES 2 and 4, at any given time a portion of the filter is presented to the flame 74 of burner 40 adjacent the inlet expansion chamber 33, where temperatures of the order of 1100 to 1300° F. are produced at the surface of the filter by the flame 74. Furthermore, as shown particularly clearly in FIGURE 5, the discharge duct 54 supplies lint-laden air from the drum 12 to the same side of filter 56, but at a portion of the filter which is circumferentially spaced from that which is simultaneously exposed to flame 74 at any given time. Suitable circular air seals such as 80, 82, which may be elastomers, are provided on each side of the ceramic filter in sliding engagement therewith, and serve to define a discharge path for gas flow from discharge duct 54 to the exterior.

As shown in FIGURE 4, the circular filter regions 90, 92 of filter 56 defined by the expansion chamber 33 and the seals 80, 82 associated with discharge duct 54 have their centers equally spaced radially from the axis of rotation of filter 56, region 92 being somewhat smaller than circular region 90, so that the entire region 92 impinged by air flowing by way of discharge duct 54 is exposed to the high temperatures of the flame in combustion chamber 34 when the filter has rotated by an appropriate amount.

In this embodiment, filter 56 is in the general form of a circular plate. Since it is heated to high temperatures by flame 74, the filter is preferably made of a high-temperature-resistant substance which also preferably has high resistance to thermal shock because of the substantial changes in temperature to which it is subjected in passing alternately between the very high temperatures of the burner chamber and the cooler environment of the discharge duct. Preferably also the filter is of a material of low thermal conductivity so that heat is not wasted by transfer from the burner chamber to the discharge duct by way of the filter.

The filter is constructed so as to permit passage of air therethrough without producing an unduly large pressure drop across it. It is also configured so as to collect lint from the air stream in the discharge duct and so as to trap the lint so that it moves with the rotation of the filter and so as to hold the lint in its trapped position on the filter without dislodgment in moving through the sliding contacts of seal 82.

One preferred form of such a filter which has been found especially advantageous for this purpose is represented in detail in FIGURE 6. It consists of a cellular ceramic body comprising a plurality of closely-spaced honeycomb-like openings such as 86 extending through the filter parallel to the direction of flow of air in discharge duct 56 and in expansion chamber 33. As shown in FIGURE 4, the cellular ceramic filter is preferably bounded at its circumference by a tightly-fitting circular metal band 87 which maintains the filter in compression, thus minimizing the possibility of cracking of the filter during its alternating heating and cooling cycles. On the surface of the filter which is impinged by the discharge air in the duct 54 and which is subjected to heating by flame 74, there are provided a plurality of recesses such as 94, having lateral dimensions large compared with the diameters of the individual honeycomb-like openings such as 86, and which extend only partially through the thickest dimension of the filter, for example half-way through it. The sidewalls of these recesses, such as sidewall 100 of recess 94, are irregular, typically being made up of adjacent portions having respective radii of curvature in the transverse direction which are many times smaller than the maximum transverse dimensions of the recesses. This irregularity in the sidewalls assists in entrapping the collected lint, and the depth of the recesses causes the lint to be collected below the surface of the filter so that it will not be wiped off or dislodged when moving past the seal 82. To provide a strengthening reinforcement of the face of the wheel containing the recesses, the corrugated walls between the recesses are preferably coated with a strong, high-temperature-resistant material such as the porcelain cement known as Sauereisen, which may be applied for example by painting or dipping.

Without thereby limiting the scope of the invention, the following specific values and dimensions of one particular embodiment of the invention are given in the interest of complete definiteness.

In one example the ceramic filter 56 was ten inches in diameter, circular in form, and one-half inch thick. The center of the filter was a three-quarter inch diameter solid ceramic disc containing a half-inch diameter hole for mounting the screen on its rotatable drive shaft. The filter was made of a glass ceramic composition known as Pyroceram made by Corning Glass Co., the portion thereof outside the solid center being of known thin-walled cellular ceramic form. The material used had a coefficient of thermal expansion of about $-2 \times 10^{-7}$ cm./cm./°C. The honeycomb-like openings were triangular in form, each triangle being about 0.040 inch in height, with a base width of about 0.075 inch. The thermal conductivity of the material was about 0.0047 cal./cm.²/sec./cm./°C. The filter contained twenty-five to twenty-eight honeycomb openings per lineal inch along the diameter of the screen and seventeen to eighteen openings per lineal inch around the circumference of any wall concentric with the drive shaft mounting hole. The recesses such as 94 had an area of approximately one-third to one-half square inch, the depth of each pocket being about one-quarter inch, i.e. one-half the total thickness of the screen. The recesses were formed by means of a rotating end-mill tool having a flat end-face applied perpendicularly to the plane of the circular face of the screen and moved about transversely of the screen to remove material therefrom. The diameter of the end mill was many times smaller than the transverse dimension of each recess, typically being of the order of three-eighths inch or less in diameter. The screen was then held in compression by a circular stainless-steel rim about its periphery.

Burner chamber 34 included the power burner nozzle 40 provided with flame retention ports and producing approximately 37,000 B.t.u.'s per hour. The distance from the tip of the burner to the portion of the ceramic screen on which incineration took place was about eight inches, and the opening provided by the dilution-air shutter 37 was about one square inch. A suitable gas pilot and flame safety control arrangement 124 of conventional form was also provided for the usual starting of the flame and for shutting off the gas supply in the event the flame should disappear. The temperature produced at the ceramic filter by the burner was about 1200 to 1300° F.

In the overall operation of the dryer, the clothes to be dried are placed in the drum and the usual sealed door (not shown) is closed. The system is turned on to rotate the drum 12, the ceramic filter 56 and the blower 38, and to operate the gaseous fuel burner 40. Air is thereby drawn through the burner 40, rotating ceramic filter 56, inlet duct 24, orifice 26 and openings 30 into drum 12, and dilution air is also drawn in through opening 36 to inlet duct 24 and thence in the same manner to drum 12. Blower 38 then discharges the air from drum 12 through discharge duct 54 by way of rotating filter 56. The discharge air in passing through rotating ceramic filter 56 continuously deposits lint in the recesses such as 94 therein. Rotation of the filter continuously carries the so-deposited lint out of discharge duct 54 to the interior of the burner chamber 34 where it is continuously incinerated by flame 74. The heat used to incinerate the lint and the heat produced by such incineration are thereby applied to assist in the heating of the inlet air to drum 12. The incineration of the lint once each revolution of the ceramic fiter keeps it clean and open to permit a constant free flow of discharge air through it. Because the air from the burner chamber and the air in the discharge duct strike the filter from the same side the lint is not blown off the filter by the flow of air in the burner chamber.

A typical speed of rotation of the ceramic filter is about ⅓ revolution per minute.

Lint cleaning efficiency was of the order of 90% and combustion of the lint, including residual tars and ashes, was substantially complete. With most materials no odor was produced in the drying chamber during the incineration, and in any event any such odor which might be produced is effectively eliminated by the usual cooling-off portion of the drying cycle during which air continues to pass through the system with the burner flame absent.

It will be understood that various conventional controls and safety devices may be incorporated in this system. For example, a safety mechanism may be utilized to indicate a failure of the ceramic lint filter to rotate, and to cut off the gas supply to the burner upon any such failure.

The resultant system was also found to be operable to produce efficient drying and lint removal and incineration over a substantial range of input line voltages supplied to the motor 14 and despite substantial variations in the fuel supply input to the burner.

While the invention has been described in the interests of definiteness with particular respect to specific embodiments thereof, it will be understood that it may be embodied in any of a large variety of forms differing substantially from those specifically described, without departing from the scope and spirit of the invention as defined by the appended claims.

I claim:
1. In a heated-gas system;
   means for producing a flow of gas along a path through said system;
   burner means for heating said gas at a first location along said path in said system;
   means for collecting foreign bodies borne by said gas, at a second location in said system spaced along said path downstream from said first location; and
   means for transferring said collected foreign bodies from said second location to said first location for incineration by said burner means.

2. Apparatus in accordance with claim 1, in which said collecting means comprises means movable between a first position in which at least a portion thereof is exposed to said gas at said second location to collect foreign bodies therefrom, and a second position in which said portion bearing said collected foreign bodies is exposed at said first location to temperatures above the ignition point of said foreign bodies, and in which said transferring means comprises means for moving said movable means between said first and second positions.

3. Apparatus in accordance with claim 2, in which said movable means comprises a structure extending into said gas-flow path at said first and second locations simultaneously, said structure being rotatable to present the same surface regions thereof to impingement by said gas flow, sequentially and repetitively at said first and second locations.

4. Apparatus in accordance with claim 2, in which said portion of said movable means is transmissive of said gas and the surface of said portion which is impinged by said flow of gas at said second location contains recesses for entrapping said foreign bodies.

5. Apparatus in accordance with claim 4, in which said movable means comprises a cellular ceramic filter.

6. Apparatus in accordance with claim 2, in which said burner means comprises a burner of gaseous fuel and said foreign bodies are incinerated by the flame of said burner.

7. A structure for entrapping gas-borne foreign bodies and for supporting said foreign bodies for subsequent incineration, comprising a cellular ceramic filter having a plurality of recesses on one surface thereof of larger diameter than the openings of said filter, said recesses extending in depth only partially through said filter.

8. The structure of claim 7, in which each of said recesses has irregular sidewalls.

9. The structure of claim 8, in which each of said irregular sidewalls comprise portions in which the radius of curvature of the sidewall transverse to the depth of the recess is many times smaller than the maximum transverse dimension of the recess.

10. A heated gas flow system comprising:
    a chamber;
    gas inlet means for said chamber;
    gas outlet means for said chamber;
    means for providing a flow of gas from said inlet means through said chamber to said outlet means;
    burner means disposed at said gas inlet means for heating said gas prior to its entering said chamber;
    collecting means extending between and into said inlet means and said outlet means and rotatable about an axis between said inlet means and said outlet means; and
    means for rotating said collecting means to move given portions thereof alternately through said inlet means and said outlet means;
    said burner means being positioned to incinerate foreign bodies on portions of said collecting means within said inlet means.

11. In a clothes dryer having an air-containing clothes drying compartment in which lint is dispersed into the air, an air inlet duct for conducting a flow of air to said compartment, an air discharge duct for discharging air from said compartment, means for establishing a flow of air from said inlet duct to said drying compartment and thence to said discharge duct, and a gaseous-fuel burner chamber providing a flame for heating air at said inlet duct;

a lint filter rotatable about an axis eccentric with respect to said inlet duct and said discharge duct, said filter extending into said discharge duct transversely to the flow of said gas in said discharge duct to collect and entrap said lint on a portion thereof and also extending into said burner chamber so that rotation of said filter about said axis transfers said collected and entrapped lint from said discharge duct to a position in said burner chamber for incineration by said flame; and means for rotating said filter about said axis, whereby lint is abstracted from air in said discharge duct and incinerated in said burner chamber.

12. Apparatus in accordance with claim 11, in which said filter is of cellular ceramic structure and said burner chamber communicates with said inlet duct so that air is drawn through said burner chamber into said inlet duct by said flow-establishing means to increase the heat produced by said burner.

13. Apparatus in accordance with claim 12, in which said burner chamber and said discharge duct are oriented and located so that the flow of said air from said burner chamber and from said discharge duct impinge the same side of said filter, said filter having a low thermal conductivity.

14. Apparatus in accordance with claim 13, in which said inlet duct includes an orifice to the exterior and a variable shutter for controlling the flow of air drawn into said inlet duct through said orifice.

References Cited by the Examiner
UNITED STATES PATENTS

| | | | |
|---|---|---|---|
| 2,809,025 | 10/1957 | Pettyjohn | 34—82 X |
| 2,858,110 | 10/1958 | Blaskowski | 165—10 X |
| 2,958,140 | 11/1960 | Smith | 165—8 X |
| 2,983,486 | 5/1961 | Rosenberg | 165—10 X |
| 3,031,772 | 5/1962 | Sasnett | 34—82 |
| 3,132,006 | 5/1964 | Brucken | 34—82 X |
| 3,263,343 | 8/1966 | Loos | 34—82 |

FREDERICK L. MATTESON, Jr., *Primary Examiner.*

JOHN J. CAMBY, *Examiner.*